United States Patent [19]

Dehlsen

[11] Patent Number: 5,044,939

[45] Date of Patent: Sep. 3, 1991

[54] REVERSING LINEAR FLOW TPV PROCESS AND APPARATUS

[76] Inventor: James G. P. Dehlsen, 21221 Carriage Dr., Tehachapi, Calif. 93561

[21] Appl. No.: 599,398

[22] Filed: Oct. 18, 1990

[51] Int. Cl.$^5$ .................. F27D 7/00; F27D 17/00
[52] U.S. Cl. .................................... 432/25; 432/30; 432/181; 431/170; 136/253
[58] Field of Search ................ 432/9, 10, 12, 15, 25, 432/30, 181, 180; 431/170; 136/253

[56] References Cited

U.S. PATENT DOCUMENTS

| | | | |
|---|---|---|---|
| 4,671,346 | 6/1987 | Masters et al. | 432/181 |
| 4,898,530 | 2/1990 | Wills et al. | 432/181 |
| 4,944,670 | 7/1990 | Watson | 431/170 |
| 4,976,611 | 12/1990 | Knop et al. | 432/181 |

*Primary Examiner*—Henry C. Yuen
*Attorney, Agent, or Firm*—William W. Haefliger

[57] ABSTRACT

A linear combustion emitter regenerator process capable of operating at high temperatures for sustained periods of time, that includes flowing reactants including fuel and air to a combustion zone; adding regenerated heat to at least one of the reactants flowing to the zone; combusting the reactants at the zone to produce combustion products at high temperature, to heat radiant emitter; operating the emitter to radiate energy from the zone passing selective wavelengths of said radiated energy spectrum through an optical filter and converting the radiation from the emitter into photovoltaic-produced electricity; mounting optical filter on water-cooled window to act as a heat shield to protect photovoltaic cells from overheating; reflecting back to the emitter portions of the spectral emission not able to activate the photovoltaic cells; extracting heat absorbed by liquid-cooled window by means of a heat exchanger to transfer heat to incoming combustion air; extracting heat from the combustion products for return to the at least one of the reactants as the recuperated heat; removing the products of combustion at reduced temperature, and; providing a porous bed at and to which the extracted heat is transferred; and periodically reversing the direction of flow of at least one of the reactants, and in heat transfer contact with the bed.

14 Claims, 4 Drawing Sheets

REVERSING LINEAR FLOW TPV PROCESS AND APPARATUS

BACKGROUND OF THE INVENTION

This invention relates generally to combustion/emission/regeneration processes, and more particularly, to such a process wherein heated media produces radiant energy for conversion to electrical power, as by photovoltaic cells exposed thereto. The invention is particularly applicable to thermophotovoltaic (TPV) electric power generation.

It is known to employ a high temperature radiant emitter, heated by fuel combustion, to activate thermophotovoltaic cells. See for example U.S. Pat. No. 4,836,862 to Pelka.

The present invention improves upon the power density, conversion efficiency and apparatus as disclosed in the Pelka patent, through provision of a highly efficient, linear flow combustion/emission/regeneration process and apparatus, wherein the flows of air and of combustion products are periodically reversed through valve operation which controls both of such flows. Furthermore, the method of energy conversion integrates spectral characteristics of the radiant emitter with an optical filter and the photovoltaic cells. Accordingly, the invention fulfills a need for such simple, highly efficient apparatus, as well as process.

SUMMARY OF THE INVENTION

Basically, the process of the invention involves operating of a linear combustion/emission/regeneration apparatus, and employs the steps:

a) flowing reactants including fuel and air to a combustion zone, b) adding recuperated heat to at least two of the reactants flowing to the zone, c) combusting the reactants at the zone to produce combustion products at high temperature, to heat a radiant emitter, d) radiating a selected spectrum of energy and converting the radiated energy into photovoltaic-produced electricity, e) extracting heat from the combustion products for return to the at least two of the reactants as regenerated thermal energy, f) removing the products of combustion at reduced temperature, and g) providing a porous bed at and to which the extracted heat is transferred, h) and periodically reversing the direction of flow of at least one of the reactants, and in heat transfer contact with the bed.

The following steps are also pertinent:

i) optically filtering radiated energy for selective transmission to the photovoltaic cells and for reflectance back to the zone, of other portions of the radiated energy spectrum not efficiently used to activate photovoltaic cells, thereby reducing fuel needed to maintain operating temperatures, j) transmitting the radiant energy through a liquid-cooled window to the photovoltaic cells, thereby protecting said cells from overheating; optically coating the window to:

i) transmit a high percentage of the radiated spectrum which activate the cells;

ii) to reflect most of the wavelengths, which do not activate the cells, back to the zone; and iii) transferring radiant energy which is absorbed by the window, or the liquid (such as water) to a heat exchanger to be extracted to heat the incoming combustion air, k) integrating the energy conversion system through selective bandwidth emittance of the radiant emitter matched to the quantum response band of the photovoltaic cells, and incorporating an optical filter which allows transmittance of said bandwidth, and maximum reflectance of other parts of the emittance spectrum. Accordingly, energy is efficiently converted and recovered simple, effective manner.

Additionally, a catalyst may be incorporated at the porous regenerative beds to reduce the amount of nitrous oxide as well as other undesirable emissions in the combustion products.

It is a further object of the invention to provide an improved process wherein the bed includes first and second portions, the step h) including flowing air through the first bed portion toward the combustion zone while hot combustion products of combustion are flowed through the bed second portion, and, subsequently flowing air through the second bed portion and toward the combustion zone while hot combustion products are flowed through the bed first portion. The bed first and second portions may advantageously consist of porous stabilized alumina or zirconia ceramic material, or beads or spheres of the same materials.

It is another object of the invention to provide a process wherein operatively interlinked valves are employed to control the air and combustion products flow, and including operating the valves to control flow of air alternately to the bed portions and to control flow of combustion products alternately from the bed portions. As will be seen, the fuel is typically flowed or fed to the combustion zone through alternating fuel burners while the direction of air flow to the zone is periodically reversed. As will be seen, heated incoming combustion air heats the operative fuel burners.

A further object is to locate the TPV (thermophotovoltaic) cell, or cells, in the path of the air flow to the combustion zone for cell cooling and further heat recovery.

It is another object of the invention to increase electric conversion by the photovoltaic cells through selective emittance provided by the emitter structure and/or the emitter materials, to closely match the bandgap of the photovoltaic cells. The emitter may advantageously consist of porous stabilized zirconia coated with ytterbium or thorium.

It is a further object of the invention to increase fuel efficiency by transmitting from the zone only the light spectrum which matches the bandgap of the photovoltaic cells. This is accomplished by means of an optical filter which may advantageously transmit in the range of 0.5 to 1.5 microns and provide high reflectance in other portions of the spectrum in the case where a silicone photovoltaic cell is the converting medium.

A further object is to increase fuel efficiency of the apparatus by transferring the heat which is absorbed by the liquid-cooled window at the zone to the incoming combustion air.

Apparatus embodying the invention basically includes:

a) an insulated chamber containing a combustion zones and radiant emitter, b) first and second beds of porous heat transfer material in paths of air flow to the zone, c) means for alternately supplying fuel to the zone for combustion with air flowing to the zone, to produce hot combustion products, d) valve means in the paths of air flow to the first and second beds for controlling air to flow alternately through the beds to the zone, and for controlling flow of the hot combustion products alternately through the beds from the zone, e) a liquid-cooled window means at the zone radiant energy to photovoltaic cells from emitter said window also serving as substrate for optical coatings for desired transmittance/reflectance characteristics, f) and thermophotovoltaic cell means exposed to light radiated from the emitter in the zone, g) a pump and heat exchanger means for transferring hot liquid from the window to incoming combustion air.

As will be seen, discharge conduits may be provided to intersect additional conduits, the valve means including valves having first portions in which air is passed to the beds, and second positions in which hot products of combustion are passed from the beds to the discharge conduits.

Additional objects include the provision of a narrowed flow path of hot combustion gases at the emitter to increase emitter temperature; the provision of a porous mantle or mantles at the emitter zone; and the provision of baffle means to allow transmission through the window to radiant energy and to deflect the flow of hot gases away from the window.

These and other objects and advantages of the invention, as well as the details of an illustrative embodiment, will be more fully understood from the following specification and drawings, in which:

DRAWING DESCRIPTION

DETAILED DESCRIPTION

Figure 1:
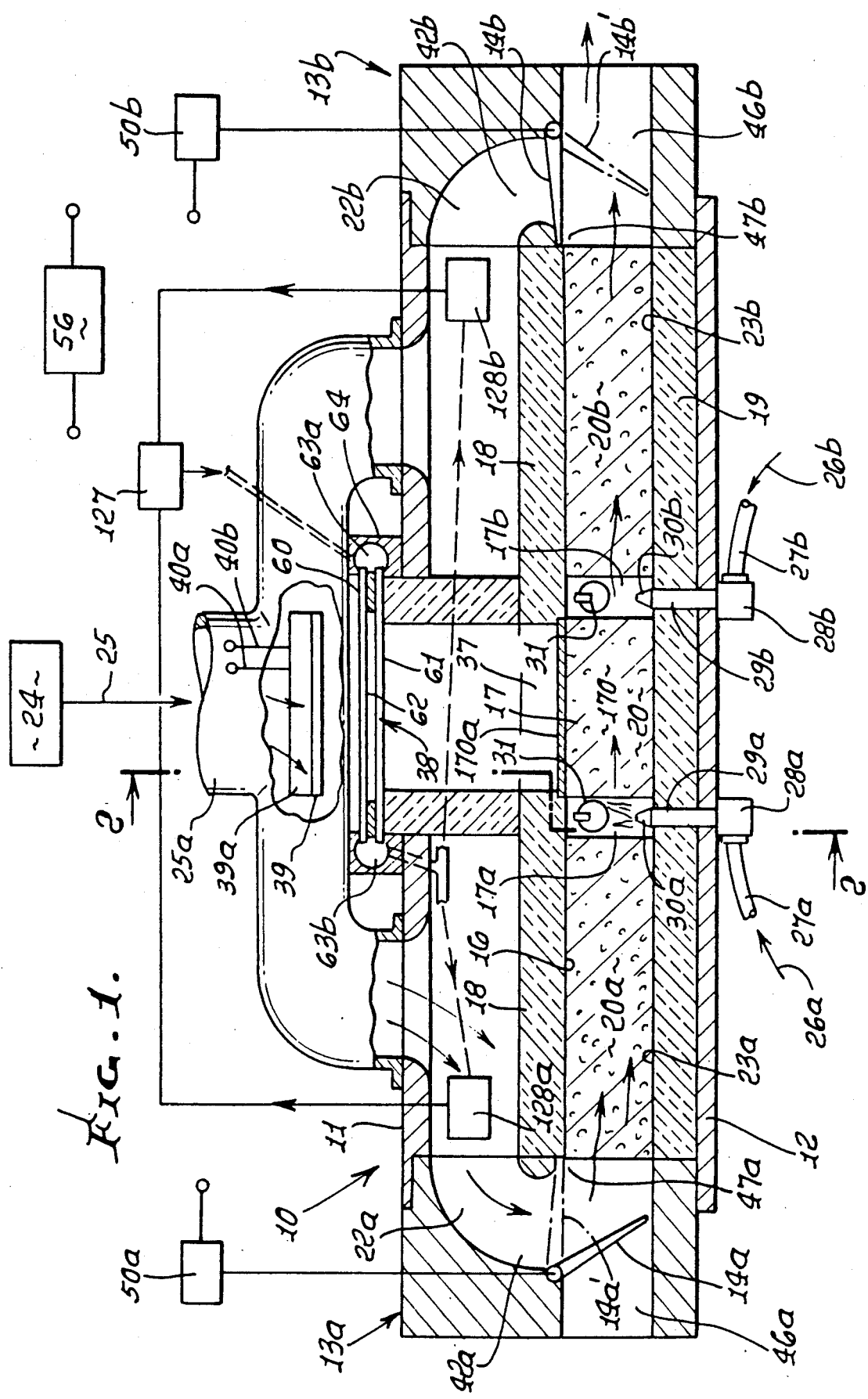
FIG. 1 is a side elevation taken through apparatus embodying the invention.
Figure 2:
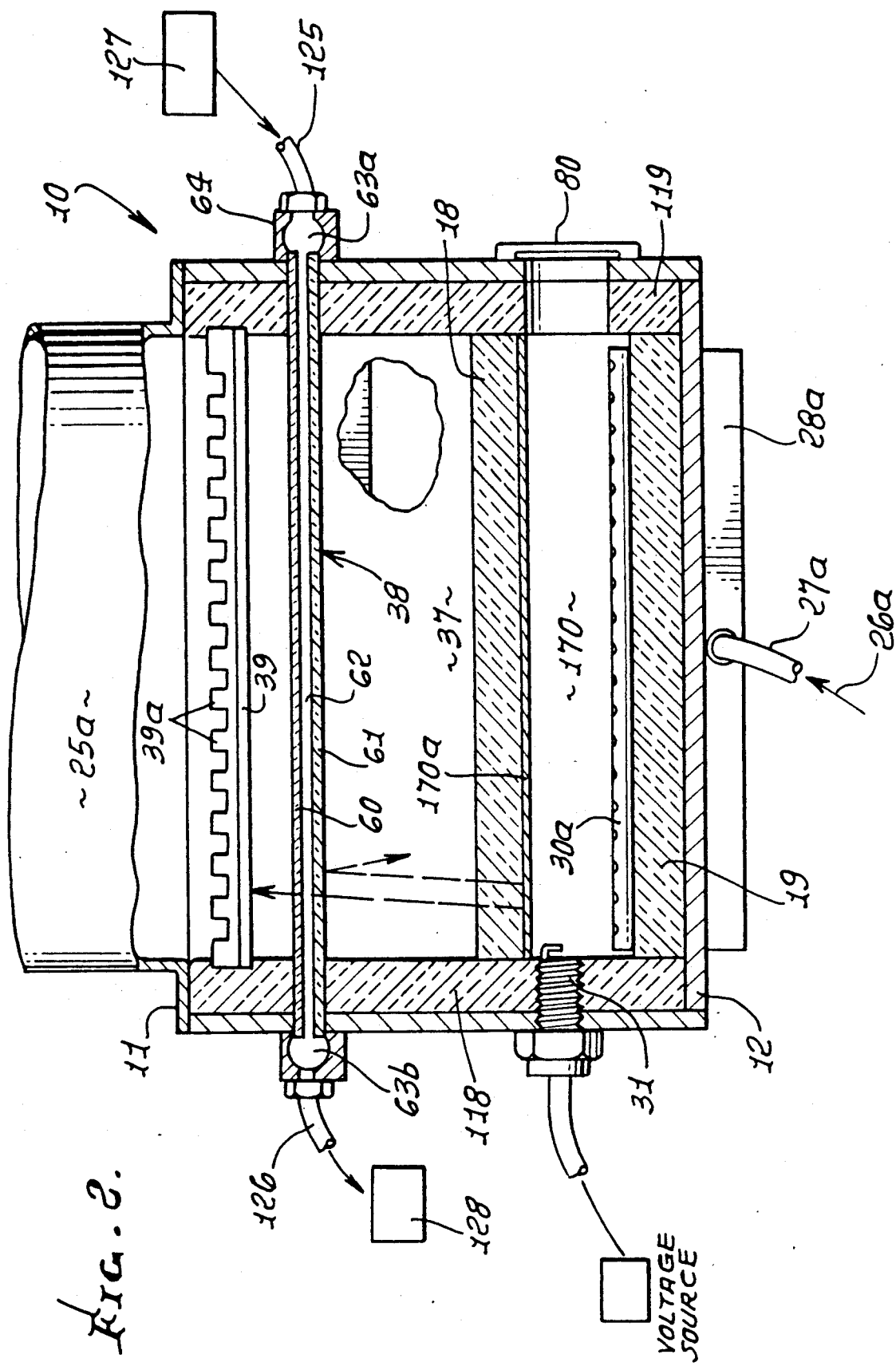
FIG. 2 is a section taken on lines 2—2 of FIG. 1.

In FIGS. 1 and 2, the combustor/regenerator/emitter apparatus includes a housing 10 having top and bottom walls 11 and 12, and like end wall structures 13a and 13b wherein valves 14a and 14b are positioned to control two flows, in each end wall, as will appear.

Within the housing is an insulated chamber 16 containing a combustion zone 17. Insulation layers 18 and 19 extend above and below a bed 20 in zone 17, and insulation layers 18 and 19 extend at its opposite sides. Layer or bed of zirconia particulate 20 is confined between 18 and 19, and combustion zone 17 encompasses hollows 17a and 17b in bed or layer 20, as shown. Hollows 17a and 17b lie at each end of zone 17, midway between end walls 13a and 13b; and the insulation layers 18 and 19, as well as porous layer 20, extend from end wall, 13a to end wall 13b. Regions 20a and 20b may be considered as first and second regenerative beds of porous, heat transfer material (such as alumina, zirconia, or magnesia particulate or other high-temperature material) in the paths of air flow to zone 17.

Such air flow paths are indicated at passages or conduits 22a and 22b, between top 11 and layer 18, and at passages or conduits 23a and 23b between the two layers 18 and 19. Thus, the beds 20a and 20b lie within paths or passages 23a and 23b. Passages 23a and 23b are linear, as are paths 22a and 22b, 23a being below 22a and parallel thereto; and 23b being below 22b and parallel thereto. A blower 24 produces a stream of pressurized air supplied at 25 to inlet 25a to the housing, for alternate flow to passages 22a and 22b.

Streams of fuel 26a and 26b are supplied via burners 30a and 30b extending transversely across the zone 17, as better seen in FIG. 2. During startup, spark plugs 31 operate to ignite fuel/air mixture at 17a of zone 17, and alternately at 17b of zone 17, whereby the hot combustion products flow through to heat radiant emitter 170 in zone 17, in the alternate manner to be described. The heated radiant emitter 170 top surface is typically coated with thorium, ytterbium, or other material to enhance desired emissivity properties, and radiates energy upwardly through an opening 37 in insulation layer 18, and through a liquid-cooled window 38 serving as a barrier for the combustion products and to protect the photovoltaic cell or cells 39 from overheating in passage or passages 26. The liquid-cooled window 38 also functions as an optical filter substrate for the optical coating provided to reflect radiation wavelengths not useful to activate the cell or cells back to the emitter 170. The radiated energy incident on the cell or cells causes them to generate electricity, for external flow as via transmission lines 40a and 40b. Input air flowing in passage 25a contacts cooling fins 39a on the backs of the cells to keep their operating surfaces cool, and to preheat the air flowing to the combustion zone. The hot liquid from window 38 is transferred to radiators 128a in passages 22a and 22b where incoming combustion air removes heat from liquid for return to window 38 by pump 128b. High efficiency results from this construction.

Additional paths connect the passages or conduits 22a and 22b with the passages or conduits 23a and 23b. Such additional paths or passages are indicated at 42a and 42b, formed in or by the end wall structures 13a and 13b;- and they may have curvatures as shown. When valve plate 14a in structure 13a is in the open air inflow position shown, valve 14b is in closed air inflow position as shown, so that entering air flows via 22a, 42a and 23a to emitter zone 17; and when valve plate 14a is in closed position, as indicated by broken lines 14a', valve 14b is in open air inflow position, as indicated by broken lines 14b', whereby entering air flows via 22b, 42b, and 23b to zone 17.

Also, the valves control discharge of combustion products from the two beds 20a and 20b. For this purpose, the end structures contain additional paths or passages 46a and 46b that intersect paths 42a and 42b proximate their junctions at 47a and 47b with passages 22a and 22b. Thus, when valve plate 14b is closed to air inflow, cooled combustion products discharge rightwardly via 46b (the combustion products having transferred heat to bed 20b); and when valve plate 14a is closed to air inflow, cooled combustion products discharge leftwardly via 46a (those combustion products having transferred heat to bed 20a). Thus, the entering air is preheated as it flows rightwardly in bed 20a, and the entering air is preheated as it flows leftwardly in bed 20b for highest efficiency. Actuators for the valves appear at 50a and 50b, and may be interlinked and operated (controlled) by a master control 56. (Valve 14a is opened when 14b is closed, and vice versa; when valve 14a is open, burner 30a is on and 30b is off; and when valve 14b is open, burner 30b is on and 30a is off.)

The liquid-cooled window unit 38 includes upper and lower glass (insulative) plates 60 and 61 forming a liquid space 62 therebetween, with liquid entering through inlet 125 and exiting through outlet 126, driven by pump 127 and connected to an air-cooled radiator 128, 128a, and 128b. See FIGS. 1 and 2, the inlet and outlet viewed from the same direction for convenience.

Cooling water is circulated to space 62 as from a manifold 63a in an annular closure 64 that extends about 60 and 61 and closes space 62 with water leaving the space through manifold 63b. The window unit 38 overlies opening 37, and peripheral portions of 18, as shown. It serves, however, to pass radiation from the heated emitter to the cell. Hot combustion gases flow or pass through the emitter 170 directly underlying the window 37. Emitter radiant surface 170a lies at the top of the emitter and has a reduced porosity, while emitter bed 170 has a high porosity such that combustion gases will tend to flow through the emitter bed rather than into opening 37. The top layer of the emitter is coated with a rare earth oxide, such as thorium or ytterbium, to enhance its emittance properties with respect to the selected photovoltaic cells or cell.

In operation, entering air passes via 22a, 42a, and 23a to zone 17a, where fuel is injected through burner 30a, combusted to heat emitter 170, hot combustion products flowing rightwardly in bed 20b to be cooled therein and to discharge via path 46b. During this cycle, burner 30b is turned off by the master control. The hot emitter in zone 17 radiates heat upwardly to the photovoltaic cell. When the valve positions are reversed, entering air passes via 22b, 146b and 23b to zone 17, where fuel is injected through burner 30b and is combusted to heat emitter 170, hot combustion products then flowing leftwardly in bed 20a to be cooled therein and to discharge via path 46a. During this cycle, burner 30a is turned off. The hot emitter 170 in zone 17 radiates energy upwardly to the photovoltaic cell.

During each phase of the air flow through a bed, the air is heated by virtue of heat transferred to that bed during the prior phase of the hot combustion products flow to and through that bed. During start up, the time intervals between air/exhaust valve position switching are relatively long, and reactant flow is high as each bed increases in temperature, whereas at and during normal operation ranging between 1600° C.–2000° C., the valve positions are switched at shorter time intervals (as for example between 10–20 seconds) and reactant flow is reduced to levels which just maintain operating temperature. Regeneration efficiency ranges between 75% and 90% depending on the cycling rate, and the type and amount of bed material.

Figure 3:
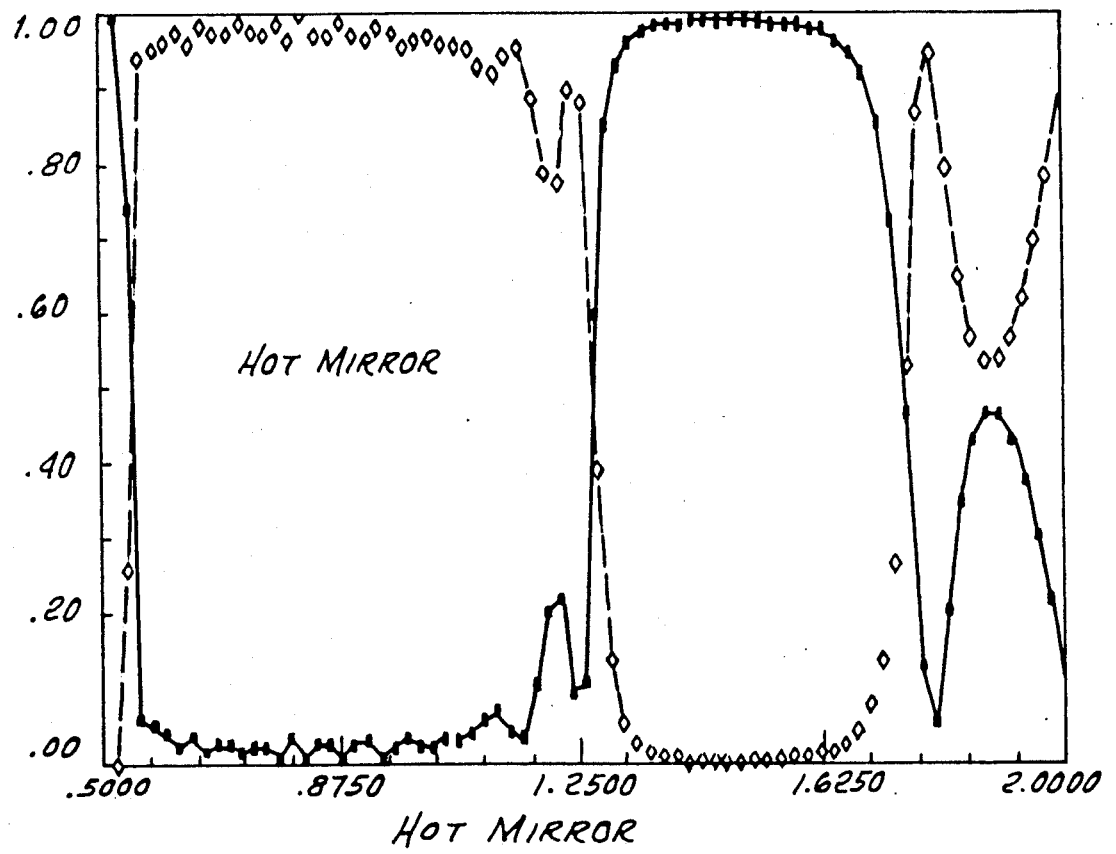
FIG. 3 is a graph.

FIG. 3 shows an example of the relative transittance and reflectance of certain optical coatings on the liquid-cooled window for radiation wavelengths between 0.5000 and 2.000 microns. The type of coating selected is determined by the bandgap of the photocell whereby the coating allows a high percentage (85% for example) transmittance of waveband best suited to activate the photocells, and a high percentage (95% as an example) of wavelength too long (too little energy) or too short (too much energy) to activate the cells to be reflected back to the zone for greater fuel efficiency.

A viewing port is shown at 80 in FIG. 2.

Figure 4:
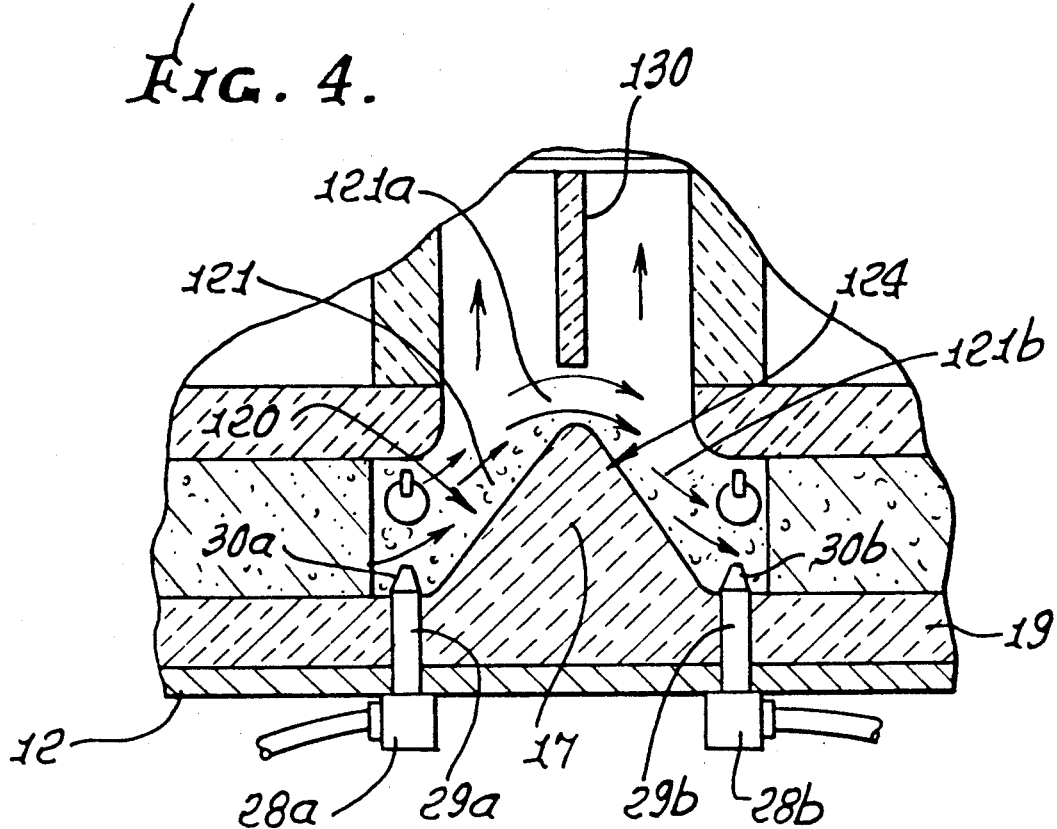
FIG. 4 shows an alternate emitter structure.

Referring to FIG. 4, the construction is the same as in FIG. 1 except that space 17 is filled with heat resistant particles which, when heated, function as the radiant emitter. An upwardly tapering, insulative material 124 in the center of space 17 now forms a narrowed path for concentrating the flow of the combustion products at the surface of the emitter particle bed, the narrowed path being in radiation transmitting alignment with the photovoltaic cell. See for example the particle emitter structure at 120 above and to the right of burner 30a, forming the narrowing path 121 which reaches a minimum width at 121a just before that path enlarges again at 121b above and to the left of burner 30b. The upwardly tapering insulative material 124, guides the combustion products to concentrate the highest temperatures near the emitter top surface. Again, the emitter may consist of heat resistant particulate, such as hollow or solid zirconia beads, or magnesia beads. Enhanced heating of exposed emitter surface is thus achieved, i.e., between 1800° C. and 2200° C., for high efficiency. This emitter particulate may also be coated with rare earth oxides of ytterbia, or thoria, for enhanced emittance characteristics.

A flow-directing insulative baffle 130 is provided between the emitter narrowed zone 121a and the cell means to guide the flow of products of combustion evenly across the surface of the emitter, away from the window, and towards the exhaust bed.

Figure 5:
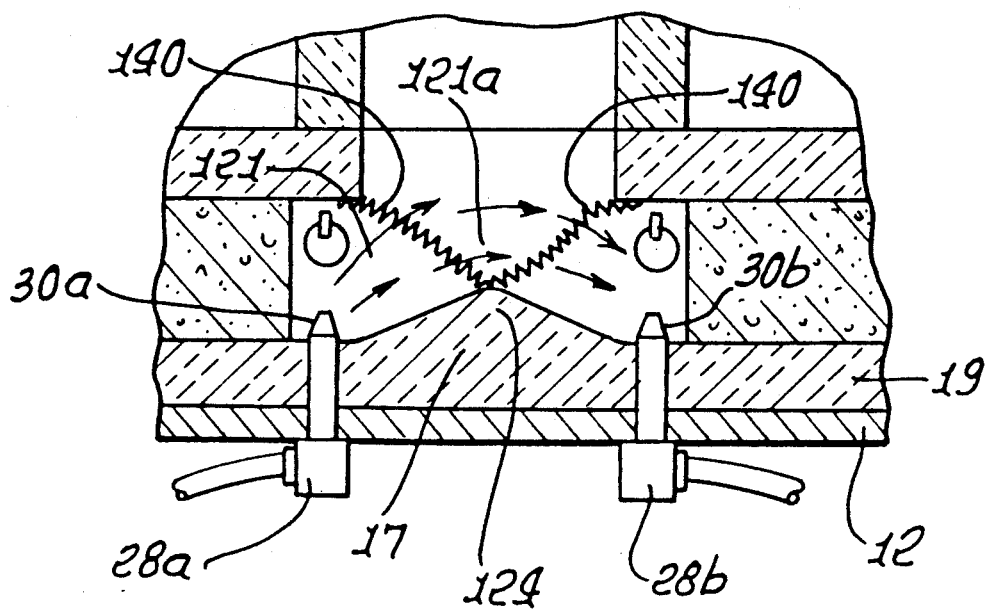
FIG. 5 shows yet another emitter structure.

In FIG. 5; the construction is again the same as in FIGS. 1–4; but in addition, a planar ceramic textile mantle or a thin porous ceramic mantle or mantles 140 is or are provided, as shown, to comprise part of the emitter or the emitter itself. In the latter event, the particulate above the support 124 is omitted, and the mantle or mantles are directly heated by the hot combustion products whose flow is concentrated at paths 121 and 121a, as before. The mantle construction may be the same as known mantles in use on gas lamps, i.e., a refractory oxide/textile, such as zirconia, with high porosity. The mantle may be coated with ytterbium or thorium other rare earth oxides to enhance emittance appropriate to the type of PV cell used.

The performance of the apparatus at various operating temperatures is modeled as follows:

Blackbody radiation exitance equation for a wave length interval of lam to lam+d(lam) is $$E_{lam}dlam = \frac{2\pi hc^2 n^2 (lam)^{-5}}{e^{hc/lamkT}-1} d(lam)$$

where
h: Plant's Constant
c: Velocity of Light in Vacuum
k: Boltzman's Constant
n: Refractive Index of the Emitter
T: Absolute Temperature
lam: wave length The emitter used is the ceramic combustion bed. High temperature ceramics have been shown to possess selective emission characteristics, i.e., their emission intensity distribution is more shifted towards the shorter wave lengths. Therefore, the blackbody radiation exitance distribution is shifted to correspond to higher temperatures than the actual temperature.

The integrated exitance over the wave length interval gives the photon flux, P(lam), which is convolved with the optical transmission function T(lam) and the photovoltaic external quantum efficiency Q(lam) to product the predicted short circuit current density $J_{SC}$ as $$J_{SC} = {}^{6m}p(\text{lam}) \, T(\text{lam}) \, Q(\text{lam}) \, d\text{lam}$$

The electric output per unit area $P_E$ can then be computed as $$P_E = J_{SC} \cdot V_{OC} \cdot FF$$

Where $V_{OC}$ is the PV cell measured open circuit voltage and FF is the cell fill factor.

The overall electric to fuel device efficiency $\text{Eta}_{ef}$ is computed according to the equation where $$(\text{Eta}_{ef} = E_{pv}/(E_{rad}/\text{Eta}_{th} - (E_{rad} - E_{window}) \times \text{Eta}_{he}),$$

where:

f-1 The TPV system has a regenerative thermal system efficiency ($\text{Eta}_{th}$) of 0.90. This was demonstrated in previous patents (Pelka et al.—Attachment 10).

f-2 The TPV system has a heat exchanger efficiency $\text{Eta}_{he}$ of 0.75. This means that 75% of the infrared heat, and short wave energy in excess of the cell bandgap, is absorbed by the window cooling system and is used to heat incoming air.

$E_{rad}$) is the total fuel energy input per unit area is $E_{in}$, the total energy radiated in the photovoltaic window per unit are is $E_{window}$ and that the photovoltaic energy window output per unit area is $E_{pv}$ then the electric to fuel efficiency $\text{Eta}_{ef}$ is calculated as

| Cell Coating | Eff | Energy Density (w/cm²) (kw/sqft.) | | | |
|---|---|---|---|---|---|
| | | 2500° K. | 2200° K. | 2000° K. | 1800° K. |
| Stanford-Coherent | 25% | 12.5/11.6 | 6.6/6.1 | 3.2/3.0 | 2.4/2.2 |
| $\text{Eta}_{hc} = 0.75$, $\text{Eta}_{th} = 0.9$ | | | | | |

Stanford PV Cells—measured performance of these cells used for model

I claim:

1. A linear combustion emitter regenerator process capable of operating at high temperatures for sustained periods of time, that includes
   a) flowing reactants including fuel and air to a combustion zone,
   b) adding regenerated heat to at least one of the reactants flowing to said zone,
   c) combusting the reactants at said zone to produce combustion products at high temperature, to heat a selective or blackbody radiant emitter,
   d) operating the emitter to radiate energy from said zone and converting said radiation from the emitter into photovoltaic produced electricity,
   e) extracting heat from said combustion products for return to said at least one of the reactants as said regenerated heat,
   f) removing the products of combustion at reduced temperature, and
   g) providing a porous bed at and to which said extracted heat is transferred,
   h) incorporating a catalyst in the porous bed to reduce nitrous oxide and other emissions,
   i) and periodically reversing the direction of flow of said at least one of the reactants, and in heat transfer contact with said bed.

2. The process of claim 1 wherein said bed includes first and second portions, said step h) including flowing air through the first bed portion toward the combustion zone while hot combustion products of combustion are flowed through the bed second portion, and, subsequently flowing air through the second bed portion and toward the combustion zone while hot combustion products are flowed through the bed first portion.

3. The process of claim 2 wherein said bed first and second portions consist essentially of material selected from the group that includes: zirconia ceramic material, zirconia ceramic beads or spheres, magnesia beads, and refractory particulate.

4. The process of claim 3 wherein valves are provided to control said air and combustion products flow, and including operating said valves to control flow of air alternately to said bed portions and to control flow of combustion products alternately from said bed portions.

5. The process of claim 1 wherein said fuel is flowed to said combustion zone via alternating fuel burners, while the direction of air flow to said zone is periodically reversed in coordination with operation of the respective burner.

6. The process of claim 1 including providing and locating photovoltaic cells in the path of air flow to said zone.

7. The process of claim 1 including locating linearly extending insulation layers at opposite sides of said beds, and providing an opening in one of said layers with a window to pass energy radiating from said emitter in said zone.

8. The process of claim 7 including providing a photovoltaic cell in the path of said radiated energy, and in the path of air flow to said bed portions.

9. The method of claim 8 including providing a liquid-cooled window to bridge said opening and to selectively transmit portions of said radiated energy, and also operating said window as a thermal barrier to protect photovoltaic cells from overheating.

10. The method of claim 9 wherein said optical coating on said window is characterized as providing transmittance of radiated energy wavelengths serving to activate said cell, and also serving to reflect other radiated energy back toward the emitter to increase thermal efficiency of apparatus.

11. The method of claim 1 including
   a) optically filtering radiated energy through said optical coating on the emitter window to minimize transmittance of emittance spectrum energy which does not activate photovoltaic cells,
   b) extracting heat from the emitter window for return to incoming combustion air.

12. The method of claim 1 including concentrating the flow of the reactants at said emitter.

13. The method of claim 12 including directing the flow of the combustion products to a top surface defined by the emitter.

14. The method of claim 1 wherein the emitter is a porous ceramic emitter, a particle bed emitter, or a planar ceramic textile emitter.

* * * * *